(12) United States Patent
Elad

(10) Patent No.: US 11,461,464 B2
(45) Date of Patent: Oct. 4, 2022

(54) METHODS AND APPARATUS FOR MEMORY ATTACK DETECTION

(71) Applicant: Arm Limited, Cambridge (GB)

(72) Inventor: Yuval Elad, Cambridge (GB)

(73) Assignee: Arm Limited, Cambridge (GB)

( * ) Notice: Subject to any disclaimer, the term of this patent is extended or adjusted under 35 U.S.C. 154(b) by 258 days.

(21) Appl. No.: 16/829,390

(22) Filed: Mar. 25, 2020

(65) Prior Publication Data

US 2021/0303683 A1 Sep. 30, 2021

(51) Int. Cl.
*G06F 21/55* (2013.01)
*G06F 11/10* (2006.01)

(52) U.S. Cl.
CPC ........ *G06F 21/554* (2013.01); *G06F 11/1004* (2013.01); *G06F 2221/034* (2013.01)

(58) Field of Classification Search
CPC ............... G06F 21/554; G06F 11/1004; G06F 2221/034; G06F 21/79
See application file for complete search history.

(56) References Cited

U.S. PATENT DOCUMENTS

| | | | |
|---|---|---|---|
| 2011/0055464 A1* | 3/2011 | Moon | G06F 12/0246 711/103 |
| 2015/0186051 A1* | 7/2015 | Gurajada | G06F 16/24552 711/113 |
| 2018/0032275 A1* | 2/2018 | Pahwa | G06F 3/0679 |

* cited by examiner

*Primary Examiner* — Thien Nguyen
(74) *Attorney, Agent, or Firm* — Nixon & Vanderhye P.C.

(57) ABSTRACT

Aspects of the present disclosure relate to an apparatus comprising processing circuitry, a cache storage, victim row identification circuitry and victim row protection circuitry. The victim row identification circuitry is configured to detect a rapid rate of access requests from the processing circuitry to a given row of a DRAM and, responsive to said detecting, identify at least one victim row associated with said given row. The victim row protection circuitry is configured to copy data stored within said at least one victim row to the cache storage.

19 Claims, 4 Drawing Sheets

METHODS AND APPARATUS FOR MEMORY ATTACK DETECTION

BACKGROUND

The present technique relates to the field of malicious attacks against computer memory, and the detection and mitigation thereof.

One such malicious attack, known as "rowhammer" or "row hammer", takes advantage of the physical properties of dynamic random access memory (DRAM), in which charges in a given memory cell can leak to surrounding sells. An attacker can use this charge leakage to change the contents of memory locations that are physically near to an addressed memory row, for example memory locations with a higher privilege level than the memory location that is actually addressed. The attacker can thus corrupt or modify data which it is not permitted to modify, and/or read out data which it is not permitted to access.

There is therefore a desire for methods and apparatus for detecting and mitigating rowhammer attacks.

SUMMARY

At least some examples provide an apparatus comprising:
processing circuitry;
a cache storage;
victim row identification circuitry to:
  detect a rapid rate of access requests from the processing circuitry to a given row of a dynamic random access memory, DRAM; and
  responsive to said detecting, identify at least one victim row associated with said given row, and victim row protection circuitry to copy data stored within said at least one victim row to the cache storage.

Further examples provide a method comprising:
detecting a rapid rate of access requests from processing circuitry to a given row of a dynamic random access memory, DRAM;
identify at least one victim row associated with said given row; and
copy data stored within said at least one victim row to the cache storage.

Further examples provide an apparatus comprising:
processing means;
cache storage means;
victim row identification means to:
  detect a rapid rate of access requests from the processing circuitry to a given row of a dynamic random access memory, DRAM; and
  identify at least one victim row associated with said given row, and
victim row protection means to copy data stored within said at least one victim row to the cache storage means.

Further aspects, features and advantages of the present technique will be apparent from the following description of examples, which is to be read in conjunction with the accompanying drawings.

DESCRIPTION OF EXAMPLES

Figure 1:
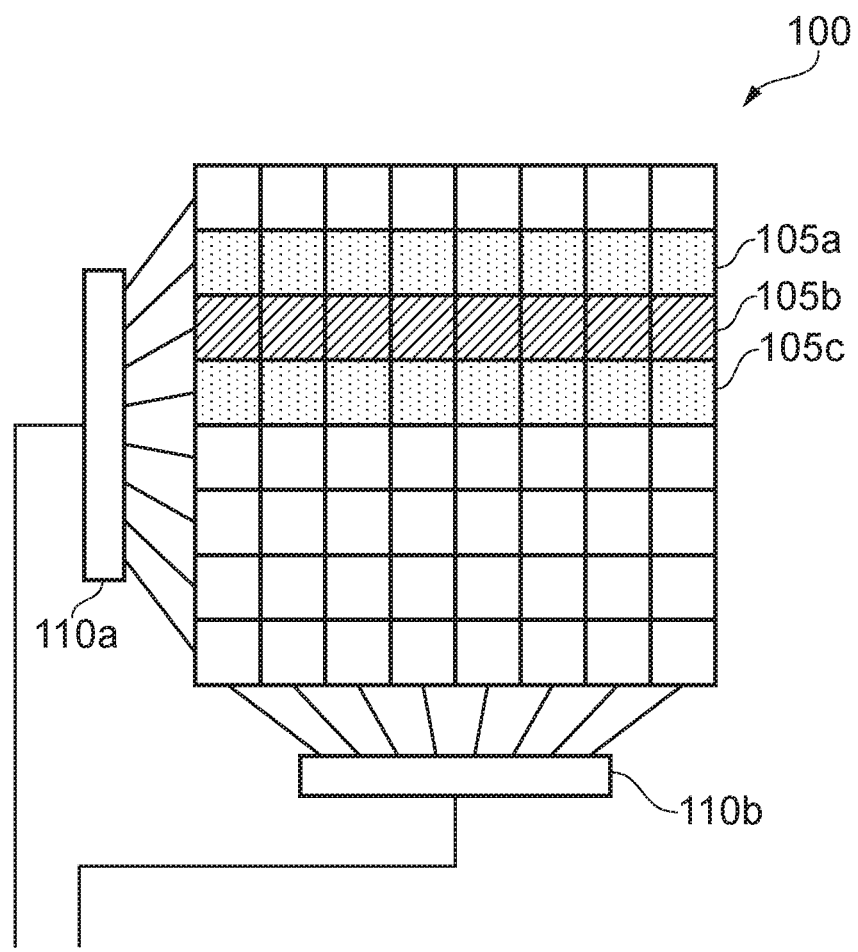
FIG. 1 schematically depicts a dynamic random access memory.

As noted above, one example apparatus comprises processing circuitry, a cache storage, victim row identification circuitry and victim row protection circuitry. The cache storage may be a system cache of the apparatus. Alternatively, the cache storage may be a buffer provided within the victim row identification circuitry, or within the victim row protection circuitry, or elsewhere.

The victim row identification circuitry is configured to detect a rapid rate of access requests from the processing circuitry to a given row of a DRAM. A rapid rate of access requests (for example, a rate that is significantly higher than would be expected from the processing of normal instructions) can be indicative of an ongoing rowhammer attack. A large number of accesses is typically required to successfully perform a rowhammer attack (for example of the order of 50000 accesses), and so the victim row identification circuitry can detect such an access pattern before the attack has succeeded (for example, the attack may be detected after approximately 5000 accesses). The rapid rate of access requests may be detected by detecting that the rate of access requests to said given row is abnormally high relative to an expected rate of access requests to said given row. Alternatively or additionally, the rapid rate of access requests may be detected by detecting that the rate of access requests to said given row exceeds a threshold.

The victim row identification circuitry is configured to, responsive to said detecting, identify at least one victim row associated with the given "hammered" row. The victim row or rows is a row or rows which is potentially vulnerable to the detected rowhammer attack. For example, the at least one victim row may comprise one or more rows adjacent to said given row. Similarly, the at least one victim row may comprise one or more rows within a given proximity of said given row. For example, if the attacked row is row N, rows N−2, N−1, N+1 and N+2 may be identified as victim rows. In another example, "victim" rows are identified as rows for which additional protection is desired, for example because they contain sensitive data.

The victim row protection circuitry is configured to copy data stored within said at least one victim row to the cache storage. A "safe" copy of the victim rows is thereby obtained, on the assumption that the safe copy is stored before the rowhammer attack has had time to succeed. Because rowhammer attacks are only effective at attacking DRAM rows within a close proximity to the hammered row, the safe copy is not vulnerable to the rowhammer attack (the cache storage being distinct from the DRAM). In one example, the apparatus comprises prefetch circuitry configured to pref etch data into the cache storage in anticipation of the processing circuitry requiring the data. The victim row protection circuitry may then be configured to perform said copying by transmitting an instruction, to the prefetch circuitry, to prefetch the data stored within said at least one victim row. This provides an efficient way of achieving the copying, using functionality (i.e. a prefetcher) which may already be provided in a given processing apparatus. In an example, the victim protection circuitry is configured to transmit an instruction to the pref etch circuitry to mark these prefetched victim cache lines as "dirty" in the cache, in order that when they are evacuated from the cache they are written back to the DRAM. Any corruption in the DRAM that occurred from the rowhammer attack after the victim lines were cached is this overwritten.

In an example, the processing circuitry is configured to, when accessing the data stored in said at least one victim row, preferentially access said data from the cache storage. This means that, even if the rowhammer attack is subsequently successful at modifying one of the victim rows, the processor will not access the modified data but will instead access the safe copy of the data in the cache storage. In examples in which the cache storage is a system cache of the apparatus, this behaviour may occur as a consequence of the storing of the safe copy: when the processing circuitry issues a request to retrieve data, that request is preferentially serviced from the system cache if that data is stored in the system cache.

In some examples, the victim row protection circuitry is configured to calculate and store error correcting code data in respect of the data stored within said at least one victim row. This provides resilience against the possibility that the rowhammer attack is partially or fully successful after the victim row or rows are evacuated from the cache storage, and thus that the "safe" copy is no longer safe: the error correcting code data can be used to detect and/or correct errors arising from the attack, so that the maliciously modified data is not used. The processing circuitry may thus be configured to, when accessing said data, use the error correcting code data to detect and/or correct one or more errors in said data. The victim row protection circuitry may comprise buffer storage in which the error correcting code data is stored. Alternatively, the victim row protection circuitry may store the error correcting code data in the cache storage or in the DRAM (for example in a location relatively distant from the hammered row).

In some such examples, the error correcting code data comprises an error correcting code in respect of given data stored within said at least one victim row, said error correcting code being different from a DRAM error correcting code stored by the DRAM in respect of said given data. This error correcting code may be based on a shifted constellation of said DRAM error correcting code. Alternatively or additionally, the processing circuitry may be configured to, when accessing said data, use said error correcting code data in combination with said DRAM error correcting code data to detect one or more errors in said data. Thus, in a system in which the DRAM already implements error correcting codes (for example in respect of each row thereof), this can be used in combination with a different error correcting code calculated and stored by the victim row protection circuitry (for example in respect of each victim row). As is explained in more detail below, the use of error correcting codes together in this manner can provide a greater degree of accuracy in error detection and correction than the use of either error correcting code singly.

In other such examples, the error correcting code data comprises an error correcting code in respect of given data stored within said at least one victim row, said error correcting code being the same as a DRAM error correcting code stored by the DRAM in respect of said given data. Whilst this does not provide the increased accuracy of error detection and correction that is provided by the use of different codes, the use of the same error correcting codes in this manner is efficient in terms of resource usage because the error correcting codes are already calculated and stored by the DRAM. For example, the victim protection circuitry may retrieve from the DRAM the error correcting codes in respect of the victim rows, instead of calculating them from scratch.

In some examples, the victim row protection circuitry is configured to calculate and store error detecting code data in respect of the data stored within said at least one victim row. Example error detecting codes (as opposed to error correcting code) include checksums, cyclic redundancy check codes, and hashes. Whilst these do not provide error correction functionality, the implementation of error detecting codes is more computationally efficient (in terms of processing resources and storage) than the aforementioned error correction functionality, and still allows detection of situations in which a rowhammer attack is successful at modifying the victim rows before they are copied to the cache storage.

In one such example, the error detecting code data comprises checksum data associated with each victim row. A single row may have multiple checksums associated therewith, such as one checksum per cache line in the row. In this example, the victim row protection circuitry determines a number of rows of said at least one victim row. The victim row protection circuitry then determines a size for the checksum data associated with each victim row, based on the number of rows, such that the checksum data has a predefined size. The victim row circuitry finally calculates the checksum data such that the checksum associated with each victim row has the determined size. This allows the per-row checksum data size to be reduced if it is desired to store checksum data for a larger number of rows, such that the total size of the checksum data has the (constant) predefined size. A dynamic trade-off is thereby provided between the number of rows to protect and the degree of protection afforded to each row (a larger checksum giving greater protection), without increasing the total size of the checksum data and thus the storage space required to store it.

Examples of the present disclosure will now be described with reference to the drawings.

FIG. 1 schematically shows a dynamic random access memory (DRAM) 100. The DRAM 100 comprises a plurality of rows, including labelled rows 105a, 105b, 105c. Each row comprises a series of memory cells, each of which has a capacitor which can store a binary 0 or 1. The DRAM 100 also comprises address decoders 110a, 110b, which are communicatively coupled to further circuitry such as a memory controller (not shown).

As can be seen from FIG. 1, the memory cells are physically adjacent in a two-dimensional array. A consequence of this is that charge can be leaked from a given memory cell to adjacent memory cells. The incidence of this increases with an increased density of memory cells.

In an example rowhammer attack, malicious software is permitted to access row 105b of the DRAM but is not permitted to access row 105a. For example, row 105a may have a higher privilege level than row 105b, for example because it comprises secret data such as encryption keys. The malicious software repeatedly activates memory cells in row 105b. Because of the aforementioned charge leakage, this repeated activation induces one or more bit flips in adjacent rows 105a and 105c. These rows can thus be termed "victim rows". The attack thus allows the malicious software to modify row 105a, even though it is not permitted to access row 105a. This can be used to modify and/or read out secret data.

Examples of comparative solutions to rowhammer attacks include, for example, increasing the DRAM refresh rate of rows that are targeted by rowhammer attacks, and/or implementing error correcting codes in the DRAM to determine and/or correct when data has been modified by a rowhammer attack. However, these comparative solutions rely on trust that the DRAM in question has implemented this functionality (and implemented it correctly), which is not guaranteed for all DRAM systems.

Figure 2:
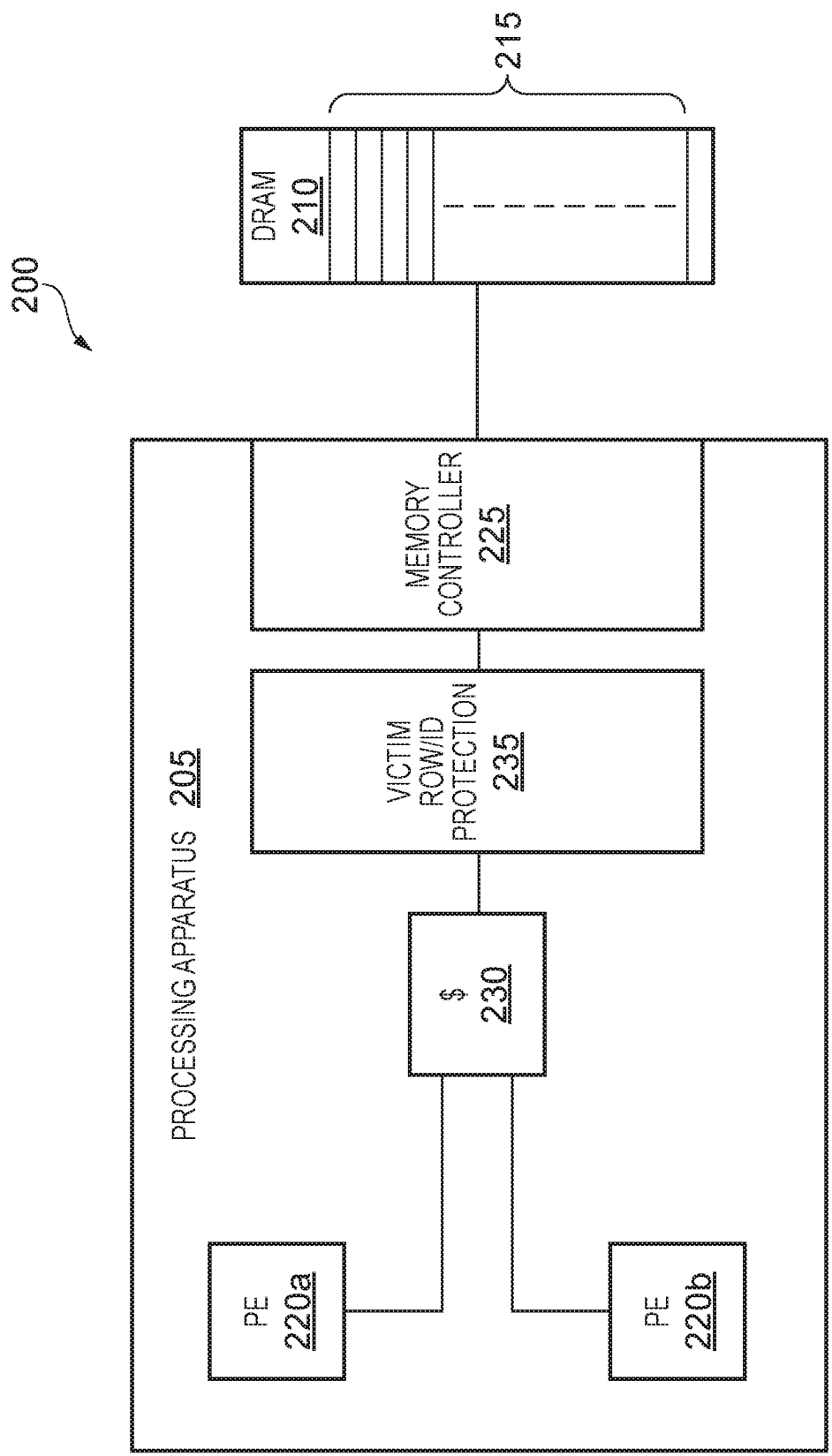
FIG. 2 schematically represents a system according to an example.

FIG. 2 schematically represents a system 200 according to an example of the present disclosure, which implements rowhammer attack detection and mitigation features. The system 200 comprises a processing apparatus 205 communicatively coupled to a DRAM 210 comprising rows 215.

The processing apparatus 205 comprises processor elements 220a, 200b. These may for example be processor cores. The processor elements 220a, 220b issue requests for data stored in the DRAM 210, on which processing operations are to be performed. The requests are serviced by a memory controller 225 which is directly coupled to the DRAM 210. The processing apparatus 205 further comprises a cache 230 into which temporary copies of data in the DRAM 210 can be stored. Retrieving data from the cache 230 is significantly faster than retrieving data from the DRAM 210.

The processing apparatus 205 further comprises a victim row ID and protection unit located communicatively between the processor elements 220a, 220b and the memory controller 225. The victim row ID and protection unit monitors memory access requests from the processor elements 220a, 220b to the DRAM 210 to identify DRAM rows 215 which may be victims of a rowhammer attack, and stores those rows in the cache. Provided that the victim rows are identified before the attack is successful, this provides a "safe" copy of the victim row data, even if the attack is subsequently successful.

Figure 3:
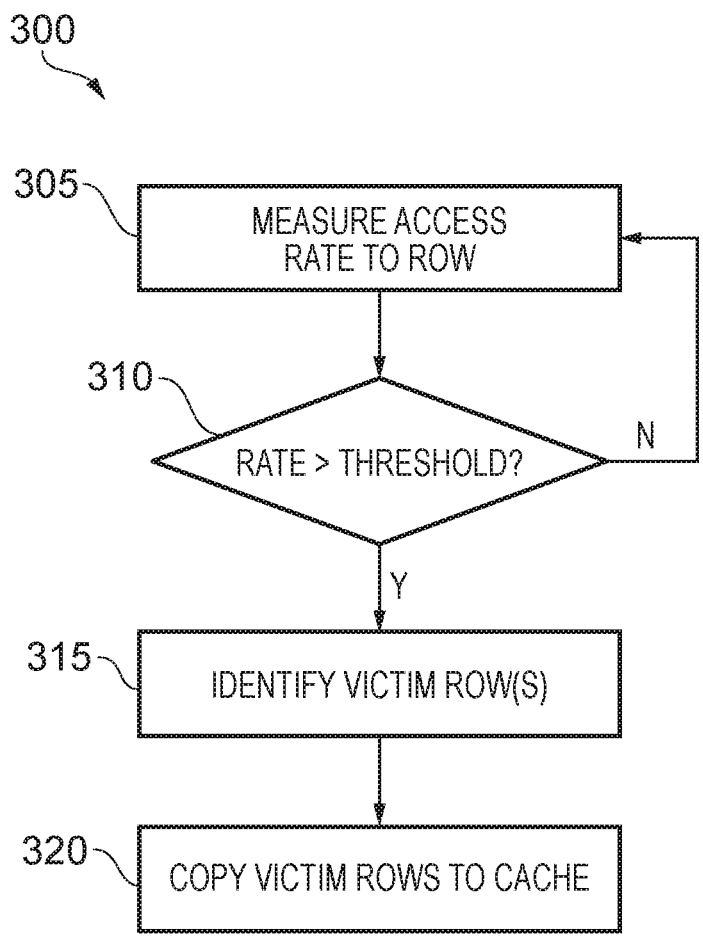
FIG. 3 depicts a method according to an example.

FIG. 3 depicts a method 300 by which the victim row ID and protection unit 235 can perform the aforementioned functionality.

At block 305, the access rate to a given row of the DRAM 210 is measured.

At block 310, it is determined whether the measured access rate exceeds a threshold. As mentioned above, a successful rowhammer attack involves a large number of memory accesses (for example of the order of 50000), with a correspondingly high access rate that would not typically occur during normal non-malicious memory access: it is unlikely that non-malicious code would repeatedly access the same DRAM row at such a rate. The threshold may thus be set equal to or higher than an expected maximum access rate of normal non-malicious memory access, such that an access rate exceeding the threshold is indicative of a rowhammer attack. If the access rate is less than the threshold, it is assumed that no attack is occurring and flow returns to block 305. If the access rate exceeds the threshold, it is assumed that an attack is occurring and flow proceeds to block 315.

At block 315, potential victim rows are identified. These rows may for example be the rows adjacent to the row for which the high access rate is determined (the hammered row), or the rows within a given distance of the hammered row (for example the two rows preceding the hammered row and the two rows following the hammered row).

At block 320, the identified victim rows are copied to the cache 230, thereby providing a "safe" copy of the data within those rows as mentioned above.

Once the victim rows are copied to the cache 230, the processor elements 220a, 220b can preferentially access the victim row data from the cache 230 instead of from the DRAM 210. In the present example, the cache 230 is a system cache of the processing apparatus 205, and so this behaviour arises naturally: when a memory access request is issued in respect of data that is stored in the cache 230, it is serviced from the cache by default instead of from the DRAM 210.

In some implementations, the victim row ID and protection unit 235 calculates and stores error correcting code (ECC) data in respect of the victim rows. For example, an ECC may be calculated and stored in respect of each victim row. This ECC data can be used when retrieving victim row data, to detect and/or correct changes to the data arising from a rowhammer attack that was successful before the victim rows were copied to the cache. The ECC data may for example be stored in the cache 230, or in buffer storage implemented within the victim row ID and protection unit 235, or at a location within the DRAM 210 sufficiently distant from the hammered row.

Figure 4:
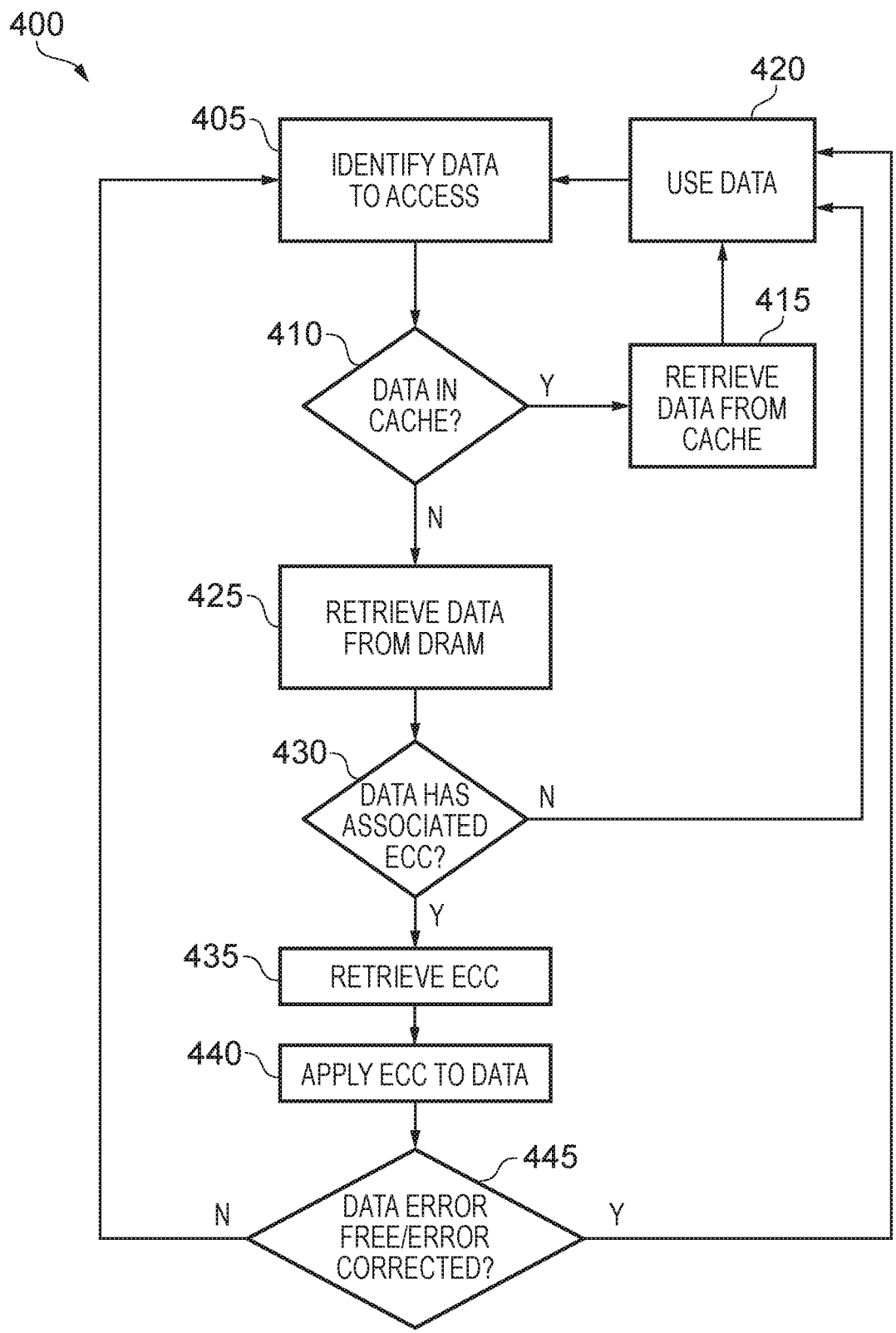
FIG. 4 depicts a method according to an example.

FIG. 4 schematically illustrates an example method 400 by which a processor element 220a, 220b can use the ECC data when retrieving data.

At block 405, the processor element 220a, 220b identifies data to access.

At block 410, it is determined whether the data is in the cache 230 (for example because it was copied to the cache by the victim row ID and protection unit 235.

If the data is in the cache 230, flow proceeds to block 415 where the data is retrieved from the cache 230. Flow then proceeds to block 420 where the data is used by the processor element 220a, 220b, after which flow returns to block 405.

If the data is not in the cache, flow proceeds to block 425 where the data is retrieved from the DRAM 210.

At block 430, it is determined whether the data has associated ECC data. For example, whilst victim row data that was previously copied to the cache 230 may have ECC data associated therewith, other data may not have associated ECC data.

If it is determined that the data has no associated ECC data, for example because the data is not in a protected victim row, flow proceeds to block 420 where the data is used by the processor element 220a, 220b.

If it is determined that the data has associated ECC data, for example because the data is in a protected victim row, flow proceeds to block 440 where the ECC is applied to the data. For example, the ECC data may be used to identify that the data contains an error, and/or to correct that error.

At block 445, it is determined whether the data is error free or whether, if the data contained an error, if that error was corrected. If either of these are true, flow proceeds to block 420 where the data is used by the processor element 220a, 220b.

If it is determined that the data contained an error, and that error was not corrected, that data is corrupt and should not be used. Flow therefore returns to block 405 without using the data. Other mitigation procedures may also be performed, for example flagging the data as unsafe.

In some examples, the DRAM 210 also calculates and stores ECC data in respect of the data stored therein, to protect against errors. For example, an ECC may be calculated and stored for each row 215 of the DRAM 210. The above-described ECC for each victim row (hereafter described as a "victim row ECC") may be the same as the DRAM ECC for that row. This allows efficient ECC determination, for example by extracting the DRAM ECC for each victim row when that victim row is copied to the cache 230. However, improved error detection and correction performance can be obtained by "cascading" the ECCs, by using the DRAM ECC as a first stage ECC and then applying the results of the above-described victim row ECC over the results of the first stage ECC. Examples of this will now be described.

In one example, the DRAM ECC and victim row ECC are used to form a two-dimensional ECC by having the victim row ECC computed over "vertical words" within a cache line, i.e. over bytes {N, N+8, N+16, ..., N+56} of the cache line, with N from 0 to 7. In this example, all accesses to the memory are performed in full cache lines, with read-modify-write operations being performed when writing a partial cache line.

In another example, the victim ECC is implemented as a shifted constellation of the DRAM ECC by using a different syndrome matrix than the DRAM ECC (which in this example is a Hamming code). An example case of a shifted constellation can be termed a "mirrored Hamming code", and is equivalent to reversing the data and then determining the corresponding Hamming code or, equivalently, determining a Hamming code working from bit 63 to bit 0 as opposed to from bit 0 to bit 63.

The mirrored Hamming code effectively creates a different set of codewords than the original Hamming code. Therefore, when the DRAM ECC erroneously corrects a bit (thus corrupting the data), there is a relatively high chance that this will be detected via the victim code ECC.

The error detection rate can be further improved if the victim row ID and protection unit 235 is aware that the DRAM ECC is enabled. In this case, if a single error is identified by way of the victim row ECC, it can be inferred that two or more errors actually occurred (because a genuine single error would have been corrected by way of the DRAM ECC).

Before a given ECC storage is assigned to a different victim row, its contents are applied to the present victim row by reading the row from DRAM and performing an integrity check. The latency of this process can be hidden by keeping a spare ECC buffer or by performing an "eager" integrity check in which a check is scheduled while the given ECC storage is still in use, or as part of the row's refresh cycle, or as part of patrol ECC scrubbing.

In some examples, instead of providing ECCs, a detection-only algorithm is used. Examples of detection-only check codes include cryptographic hashes, parity blocks, cyclic redundancy checks, or checksums. Detection-only check codes are typically less complex to determine and smaller in size than ECCs, but are limited in that they can be used to identify errors but not correct them.

In examples in which detection-only checking codes are used, check-code compression may be used to mitigate the wide potential span of rowhammer attacks. Since an attacker can attempt to hammer a single DRAM row, or to spread the hammering across multiple rows, the risk of malicious bit flips may span across multiple DRAM rows. However, increasing the row span of a rowhammer attack reduces the average number of flipped bits per row. This allows check codes to be compressed based on the attacker's behaviour, without increasing the overall storage space for storing the check codes, and without substantially compromising the overall level of protection. For example, if a single row is to be protected, a 16-bit checksum may be stored. If two rows are to be protected, two 8-bit checksums may be stored, and so on. Whilst the level of protection is thus slightly weakened with each reduction in checksum size, this allows a greater range of coverage without increasing the overall storage space for storing the checksums.

One way in which this can be efficiently performed is to protect a single row by way of a 64-bit checksum calculated in advance as separate n sums of (64/n) bits. When a second row is to be protected, the checksum of the first row can be compressed by adding the partial sums. This allows the size of the checksum of the first row to be halved to create space for the checksum of the second row, without calculating a new 32-bit checksum for the first row. This process can be repeated iteratively (n/2) times, in order to store up to n checksums for n different rows.

Similarly, if the check code is a hash as opposed to a checksum, the upper bits of an existing 64-bit hash can be truncated when a new hash is to be added for a new victim row.

Conversely, when the number of victim rows to be stored decreases, the check code can be de-compressed by reading the victim row from DRAM and re-calculating the check code for each cache line.

Apparatuses and methods are thus provided for detecting and mitigating against rowhammer attacks.

In the present application, the words "configured to ..." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

I claim:

1. An apparatus comprising:
processing circuitry;
a cache storage;
victim row identification circuitry to:
detect a rapid rate of access requests from the processing circuitry to a given row of a dynamic random access memory, DRAM, by detecting that the rate of access requests to said given row is abnormally high relative to an expected rate of access requests to said given row; and
responsive to said detecting, identify at least one victim row associated with said given row, and
victim row protection circuitry to copy data stored within said at least one victim row to the cache storage.

2. An apparatus according to claim 1, wherein the processing circuitry is configured to, when accessing the data stored in said at least one victim row, preferentially access said data from the cache storage.

3. An apparatus according to claim 1, wherein said at least one victim row comprises one or more rows adjacent to said given row.

4. An apparatus according to claim 1, wherein said at least one victim row comprises one or more rows within a given proximity of said given row.

5. An apparatus according to claim 1, wherein the victim row identification circuitry is configured to detect the rapid rate of access requests to the given row by detecting that the rate of access requests to said given row exceeds a threshold.

6. An apparatus according to claim 1, wherein the victim row protection circuitry is configured to calculate and store error correcting code data in respect of the data stored within said at least one victim row.

7. An apparatus according to claim 6, wherein:
the victim row protection circuitry comprises buffer storage; and
the victim row protection circuitry is configured to store the error correcting code data in the buffer storage.

8. An apparatus according to claim 6, wherein the victim row protection circuitry is configured to store the error correcting code data in the cache storage.

9. An apparatus according to claim 6, wherein the victim row protection circuitry is configured to store the error correcting code data in the DRAM.

10. An apparatus according to claim 6, wherein the processing circuitry is configured to, when accessing said data, use the error correcting code data to detect one or more errors in said data.

11. An apparatus according to claim 6, wherein the error correcting code data comprises an error correcting code in respect of given data stored within said at least one victim row, said error correcting code being different from a DRAM error correcting code stored by the DRAM in respect of said given data.

12. An apparatus according to claim 11, wherein:
said error correcting code is based on a shifted constellation of said DRAM error correcting code.

13. An apparatus according to claim 11, wherein the processing circuitry is configured to, when accessing said data, use said error correcting code data in combination with said DRAM error correcting code data to detect one or more errors in said data.

14. An apparatus according to claim 6, wherein the error correcting code data comprises an error correcting code in respect of given data stored within said at least one victim row, said error correcting code being the same as a DRAM error correcting code stored by the DRAM in respect of said given data.

15. An apparatus according to claim 1, wherein the victim row protection circuitry is configured to calculate and store error detecting code data in respect of the data stored within said at least one victim row.

16. An apparatus according to claim 15, wherein the error detecting code data comprises checksum data associated with each victim row, and wherein the victim row protection circuitry is configured to:
determine a number of rows of said at least one victim row;
determine a size for the checksum data associated with each victim row, based on the number of rows, such that the checksum data has a predefined size; and
calculate the checksum data such that the checksum associated with each victim row has the determined size.

17. An apparatus according to claim 1, wherein:
the apparatus comprises prefetch circuitry configured to prefetch data into the cache storage in anticipation of the processing circuitry requiring the data; and
the victim row protection circuitry is configured to perform said copying by transmitting an instruction, to the prefetch circuitry, to prefetch the data stored within said at least one victim row.

18. A method comprising:
detecting a rapid rate of access requests from processing circuitry to a given row of a dynamic random access memory, DRAM, by detecting that the rate of access requests to said given row is abnormally high relative to an expected rate of access requests to said given row;
identifying at least one victim row associated with said given row; and
copying data stored within said at least one victim row to the cache storage.

19. An apparatus comprising:
processing means;
storage means;
victim row identification means to:
detect a rapid rate of access requests from the processing circuitry to a given row of a dynamic random access memory, DRAM, by detecting that the rate of access requests to said given row is abnormally high relative to an expected rate of access requests to said given row; and
identify at least one victim row associated with said given row, and
victim row protection means to copy data stored within said at least one victim row to the storage means.

* * * * *